(12) United States Patent
Choi et al.

(10) Patent No.: US 11,989,241 B2
(45) Date of Patent: May 21, 2024

(54) ELECTRONIC APPARATUS FOR PROCESSING INFORMATION FOR PROVIDING PAGE AND METHOD THEREOF

(71) Applicant: Coupang Corp., Seoul (KR)

(72) Inventors: Jin Young Choi, Seoul (KR); Myoung Ho Park, Seoul (KR); Hyung Won Jeon, Seoul (KR); Hyung Gu Kim, Seoul (KR); In Ho Choi, Seoul (KR); Ah Ram Son, Seoul (KR)

(73) Assignee: Coupang Corp., Seoul (KR)

( * ) Notice: Subject to any disclaimer, the term of this patent is extended or adjusted under 35 U.S.C. 154(b) by 21 days.

(21) Appl. No.: 17/393,969

(22) Filed: Aug. 4, 2021

(65) Prior Publication Data

US 2022/0335093 A1 Oct. 20, 2022

(30) Foreign Application Priority Data

Apr. 14, 2021 (KR) .......................... 10-2021-0048655

(51) Int. Cl.
*G06F 16/951* (2019.01)
*G06F 16/955* (2019.01)

(52) U.S. Cl.
CPC ........ *G06F 16/951* (2019.01); *G06F 16/9558* (2019.01); *G06F 16/9566* (2019.01)

(58) Field of Classification Search
CPC . G06F 16/951; G06F 16/9558; G06F 16/9566
See application file for complete search history.

(56) References Cited

U.S. PATENT DOCUMENTS

| | | | | |
|---|---|---|---|---|
| 7,509,490 B1* | 3/2009 | Hsu | ...................... | G06Q 20/383 |
| | | | | 713/153 |
| 7,996,888 B2* | 8/2011 | Asunmaa | ................ | H04L 63/06 |
| | | | | 726/9 |
| 8,037,064 B2 | 10/2011 | Song et al. | | |
| 8,886,620 B1* | 11/2014 | Mukerji | ................ | G06F 16/954 |
| | | | | 707/705 |
| 10,110,633 B2* | 10/2018 | Laoutaris | ............... | H04L 67/535 |
| 10,559,016 B2* | 2/2020 | Tonnison | ............ | G06Q 30/0253 |
| 2003/0040970 A1* | 2/2003 | Miller | ................ | G06Q 30/0601 |
| | | | | 705/26.1 |
| 2004/0117247 A1* | 6/2004 | Agrawal | ............ | G06Q 30/0601 |
| | | | | 705/26.1 |
| 2009/0313136 A1* | 12/2009 | Giblin | ................... | G06F 21/602 |
| | | | | 705/26.1 |
| 2010/0293057 A1* | 11/2010 | Haveliwala | ......... | G06F 16/9535 |
| | | | | 705/14.66 |

(Continued)

FOREIGN PATENT DOCUMENTS

| | | | |
|---|---|---|---|
| KR | 100773206 B1 | 11/2007 | |
| KR | 100881832 B1 | 2/2009 | |

(Continued)

*Primary Examiner* — Miranda Le
(74) *Attorney, Agent, or Firm* — Banner & Witcoff, Ltd.

(57) ABSTRACT

Disclosed is a method in which an electronic apparatus processes information, the method including acquiring information for requesting access to a second page from a user terminal through a first page, confirming address information reflecting information on the first page, and providing the second page to the user terminal according to the address information.

10 Claims, 8 Drawing Sheets

(56) References Cited

U.S. PATENT DOCUMENTS

| | | | |
|---|---|---|---|
| 2011/0264533 A1* | 10/2011 | Tunguz-Zawislak | ........................ G06Q 20/102 705/14.67 |
| 2016/0078490 A1* | 3/2016 | Tumen | ............... G06Q 30/0269 705/14.66 |
| 2016/0343038 A1 | 11/2016 | Sprecher et al. | |
| 2017/0142158 A1* | 5/2017 | Laoutaris | .............. H04W 12/02 |
| 2017/0323306 A1* | 11/2017 | Kusumoto | ......... G06Q 30/0214 |
| 2021/0321170 A1* | 10/2021 | MacDougall | .......... H04N 21/84 |

FOREIGN PATENT DOCUMENTS

| | | |
|---|---|---|
| KR | 1020090029602 A | 3/2009 |
| KR | 101070053 B1 | 10/2011 |
| KR | 1020130015041 A | 2/2013 |
| KR | 1020150020461 A | 2/2015 |
| KR | 1020150121370 A | 10/2015 |
| KR | 101833728 B1 | 2/2018 |
| KR | 102134103 B1 | 7/2020 |
| KR | 1020200102853 A | 9/2020 |

\* cited by examiner

FIG. 4

| SRC list | | | | | | |
|---|---|---|---|---|---|---|
| | | | | | | Excel Download |
| SRC | Inflow | Channel | Platform | Vendor | Registration date | Registrant | Delete |
| 1221159 | Paid (1) | OtherRecruit (22) | PC (1) | AAA (159) | 2020-11-16 15:13:45 | Kim | Delete |
| 8202158 | NonAttribute (8) | Display (20) | Mobile (2) | BBB (158) | 2020-11-16 15:12:39 | Kim | Delete |
| 2183157 | NonPaid (2) | Search (18) | PC & Mobile (3) | CCC (157) | 2020-11-12 16:21:21 | Kim | Delete |
| 8229156 | NonAttribute (8) | OtherRecruit (22) | Others (9) | DDD (156) | 2020-11-12 16:20:43 | Kim | Delete |

FIG. 5

SRC 300

310 — ⌄ Inflow

| Name | Value | Delete | Update |
|---|---|---|---|
| Paid | 1 ～ 510 | 🗑Delete | ✎Modify |
| NonPaid | 2 ～ 520 | 🗑Delete | ✎Modify |
| VendorFunding | 3 ～ 530 | 🗑Delete | ✎Modify |
| CMG | 7 ～ 540 | 🗑Delete | ✎Modify |
| NonAttribute | 8 ～ 550 | 🗑Delete | ✎Modify |
| Others | 9 ～ 560 | 🗑Delete | ✎Modify |

500

320 — > Channel
330 — > Platform
340 — > Vendor

FIG. 6

| SRC Code >> SRC - Register and List | | | | | 600 | |
|---|---|---|---|---|---|---|
| Register SRC | | | | | | \| ∧ |
| INFLOW | Channel | Platform | Vendor | SRC Code | | |
| Select ∨ | Select ∨ | Select ∨ | Select ∨ | SRC Code | ✓Register | |

# ELECTRONIC APPARATUS FOR PROCESSING INFORMATION FOR PROVIDING PAGE AND METHOD THEREOF

TECHNICAL FIELD

The present disclosure relates to an electronic apparatus for processing information for providing a page and a method thereof and, more particularly, to an electronic apparatus for acquiring information for requesting access to a second page from a user terminal through a first page, confirming address information reflecting information on the first page, and providing the second page to the user terminal according to the address information, and a method thereof.

DESCRIPTION OF THE RELATED ART

Conventional advertisements have been exposed to users through mass media such as newspapers, magazines, radio, and broadcasting. However, along with the development of mobile communication technology, the number of users who access media through personal computers (PCs) or mobile devices is increasing exponentially, and thus online advertisements through websites or applications are becoming a general advertisement option.

As an example of online advertisements, there is an advertisement in the form of exposing a link or banner to a user. Furthermore, when a user input to a link or a banner is received, a page for providing the target of the advertisement to the user may be further provided to the user.

In this regard, related documents such as KR101833728B1 or KR100881832B1 may be referred to.

DISCLOSURE OF THE INVENTION

An object to be achieved by these example embodiments for solving the above issues is intended to provide an electronic apparatus for acquiring information for requesting access to a second page from a user terminal through a first page, confirming address information reflecting information on the first page, and providing the second page to the user terminal according to the address information, and a method thereof.

However, technical goals to be achieved by these example embodiments are not limited to the above-mentioned technical goals, and other technical goals may be inferred from the following example embodiments.

An information processing method of an electronic apparatus according to an example embodiment includes acquiring information for requesting access to a second page from a user terminal through a first page, confirming address information reflecting information on the first page, and providing the second page to the user terminal according to the address information.

According to an example embodiment, the information on the first page may include a serial number with a predetermined number of digits.

According to an example embodiment, a uniform resource locator (URL), which is the address information, may include the information on the first page.

According to an example embodiment, the information on the first page may be acquired by concatenating one or more elements corresponding to characteristics of the first page.

According to an example embodiment, the information on the first page may include at least one of information on a page type or a page form of the first page, fee information related to the first page, information on a type of user terminal capable of implementing the first page, and provider information related to the first page.

According to an example embodiment, the first page may include an advertisement area, and the user terminal may request access to the second page through a user input on the advertisement area.

According to an example embodiment, the image processing method may further include receiving a user input corresponding to the second page from the user terminal and analyzing an effect on the advertisement area on the basis of the user input corresponding to the second page.

According to an example embodiment, the confirming may include confirming first identification information corresponding to a program used by the user terminal to make the access request.

According to an example embodiment, the program may include at least one of a web browser installed on the user terminal and an application installed on the user terminal.

According to an example embodiment, an interface for receiving a user input may be displayed on a screen of the user terminal on the basis of the program.

According to an example embodiment, the information processing method may further include acquiring mapping information. The first identification information and identification information of the user terminal are mapped.

According to an example embodiment, the information processing method may further include storing the mapping information. The stored mapping information may be kept for a predetermined period of time.

The information processing method may further include tracking an activity history of the user terminal through at least one program other than the program on the basis of the mapping information.

The mapping information may be information to which identification information corresponding to a user is additionally mapped.

An electronic apparatus for processing information according to an example embodiment includes a transceiver, a memory configured to store instructions, and a processor. The processor is connected to the transceiver and the memory and configured to acquire information for requesting access to a second page from a user terminal through a first page, confirm address information reflecting information on the first page, and provide the second page to the user terminal according to the address information.

Any other specific details of the example embodiments are included in the detailed description and drawings.

According to the present disclosure, by confirming address information reflecting information on a first page on which access request information is transmitted and providing a second page to a user terminal according to the confirmed address information, an electronic apparatus for processing information for providing a page and a method thereof can provide a second page according to the address information reflecting characteristics of the first page.

According to the present disclosure, it is possible to ascertain along which route a user has accessed through the second page according to the address information. Also, it is possible to analyze a correlation relationship between the information on the first page and a user input corresponding to the second page. For example, when a user accesses the second page through a user input on an advertisement area, it is possible to analyze an effect on the advertisement area.

Effects of the present disclosure are not limited to the aforementioned effects, and other effects which are not

BRIEF DESCRIPTION OF THE DRAWINGS

FIG. 4 is a diagram illustrating information on a first page according to an example embodiment.

FIG. 5 is a diagram illustrating an operation of determining values of one or more elements corresponding to characteristics of a first page according to an example embodiment.

FIG. 6 is a diagram illustrating an interface for inputting values of one or more elements corresponding to characteristics of a first page according to an example embodiment.

DETAILED DESCRIPTION OF THE INVENTION

Figure 1:
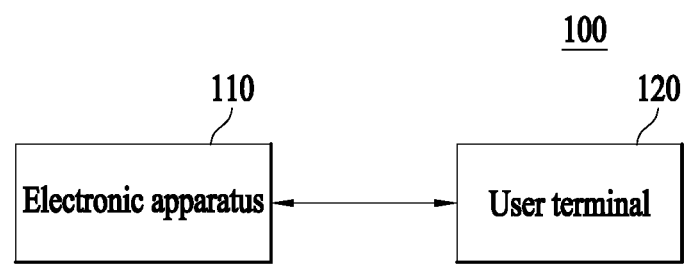
FIG. 1 is a schematic configuration diagram showing an information processing system for providing a page according to an example embodiment.

The terms used herein have been selected as general terms which are widely used at present in consideration of the functions of the present disclosure but may be altered according to the intent of an operator skilled in the art, conventional practice, or introduction of new technology. In addition, specific terms have been arbitrarily selected by the applicant and their meanings will be described in detail in the corresponding sections. Therefore, the terms used herein should be defined on the basis of the overall content of the present disclosure instead of simply the names of the terms.

Throughout the specification, when a part is referred to as including a certain element, this means that the part may include other elements rather than excluding other elements unless otherwise stated. Also, terms such as "-er," "-or," and "module" used herein refer to an element for performing at least one function or operation and may be implemented with hardware, software, or a combination thereof.

An expression "at least one of a, b, and c" used herein may encompass "only a," "only b," "only c," "a and b," "a and c," "b and c," or "all of a, b, and c."

The term "terminal" mentioned below may be implemented as a computer or portable terminal that can access a server or another terminal over a network. Here, a computer may include, for example, a notebook, a desktop, a laptop, and the like which are equipped with a web browser, and a portable terminal may be, for example, a wireless communication apparatus that guarantees portability and mobility and may include any kind of handheld-based wireless communication apparatus such as a terminal, a smartphone, and a tablet PC that are based on communication such as International Mobile Telecommunication (IMT), Code Division Multiple Access (CDMA), W-Code Division Multiple Access (W-CDMA), and Long Term Evolution (LTE).

Hereinafter, example embodiments of the present disclosure will be fully described with reference to the accompanying drawings in such a way that those skilled in the art can easily carry out the example embodiments. The disclosure may, however, be embodied in many different forms and should not be construed as being limited to the example embodiments set forth herein.

Hereinafter, the example embodiments of the present disclosure will be described in detail with reference to the accompanying drawings.

In the following example embodiments, unnecessary descriptions of the technical content which is well known in the technical field of the present disclosure and is not directly related to the present disclosure will be omitted so as to more clearly convey the present disclosure without obscuring the subject matter of the present disclosure.

For the same reason, some elements are exaggerated, omitted, or simplified in the accompanying drawings. Also, in practice, the elements may have sizes different from those shown in the drawings. The same reference numerals are used throughout the drawings to refer to the same or like parts.

Advantages and features of the present disclosure and methods of accomplishing the same may be understood more readily by reference to the following detailed description of example embodiments and the accompanying drawings. The present disclosure may, however, be embodied in many different forms and should not be construed as being limited to the example embodiments set forth herein. Rather, these example embodiments are provided so that this disclosure will be thorough and complete and will fully convey the concept of the disclosure to those skilled in the art, and the present disclosure will only be defined by the appended claims. Like reference numerals refer to like elements throughout.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or another programmable data processing apparatus, such that the instructions, which are executed via the processor of the computer or another programmable data processing apparatus, create a means for implementing the functions specified in a flowchart block(s). These computer program instructions may also be stored in a computer-accessible or computer-readable memory that can direct a computer or other programmable data processing apparatus to function in a particular manner, such that the instructions stored in the computer-accessible or computer-readable memory can also produce articles of manufacture embedding instruction means which implement the functions specified in the flowchart block(s). The computer program instructions may also be loaded onto a computer or another programmable data processing apparatus to cause a series of operations to be performed on the computer or another programmable data processing apparatus to produce a computer-implemented process, such that the instructions, which are executed on the computer or another programmable data processing apparatus, can also provide operations for implementing the functions specified in the flowchart block(s).

Also, each block described herein may indicate a portion of a module, segment, or code including one or more executable instructions to execute a specific logical function(s). Moreover, it should be noted that the functions of the blocks may be performed in a different order in several modifications. For example, two successive blocks may be performed substantially at the same time, or they may be performed in reverse order according to their functions.

FIG. 1 is a schematic configuration diagram showing an information processing system for providing a page according to an example embodiment.

According to various example embodiments, an information processing system 100 for providing pages includes an electronic apparatus 110 and a user terminal 120. In some example embodiments, the information processing system 100 for providing a page may further include a network for supporting the transmission and reception of information between at least some of the electronic apparatus 110, the user terminal 120, and other external apparatuses.

Each of the electronic apparatus 110 and the user terminal 120 may include a transceiver, a memory, and a processor. Also, each of the electronic apparatus 110 and the user terminal 120 may refer to an element for performing at least one function or operation and may be implemented with hardware, software, or a combination thereof. Meanwhile, throughout the example embodiment, the electronic apparatus 110 and the user terminal 120 are referred to as separate servers. However, this may be a logically divided structure, and the electronic apparatus 110 and the user terminal 120 may be implemented by separate functions in one server.

According to an example embodiment, each of the electronic apparatus 110 and the user terminal 120 may include multiple computer systems or computer software implemented using a network server. For example, at least one of the electronic apparatus 110 and the user terminal 120 may refer to a computer system and computer software that are connected to a lower level apparatus capable of communicating with another network server through a computer network such as an intranet or the Internet to accept a request to perform a task, perform the task, and provide a result of the performance. In addition, at least one of the electronic apparatus 110 and the user terminal 120 may be understood as a broad concept including a series of application programs operable on a network server and various databases built therein. For example, at least one of the electronic apparatus 110 and the user terminal 120 may be implemented using a network server program provided in various ways depending on an operating system such as DOS, Windows, Linux, UNIX, or macOS.

The electronic apparatus 110 may be an apparatus that configures and provides a variety of information as a webpage. The electronic apparatus 110 may be an apparatus that serves to provide item sales information or service provision information to a user, but the role of the electronic apparatus 110 is not limited thereto.

The electronic apparatus 110 acquires information for requesting access to a second page through a first page from the user terminal 120. The first page may include information related to the second page. The user terminal 120 may request access to the second page through a user input to an interface included on the first page. According to an example embodiment, the user terminal 120 may request access to the second page through a user input to an advertisement region included on the first page. In this case, the advertisement region may correspond to the interface for access to the second page or may be included in the interface for access to the second page.

The electronic apparatus 110 may confirm address information reflecting the information on the first page. The information on the first page may be acquired by concatenating one or more elements corresponding to characteristics of the first page. Also, the address information may correspond to a uniform resource locator (URL).

The electronic apparatus 110 provides a second page to the user terminal 120 according to the address information. The second page may include access request information acquired from the first page and related information. According to an example embodiment, the second page may include information corresponding to the advertisement region included on the first page. For example, the second page may provide sales information of an item to be advertised or provision information of a service to be advertised.

More details related to the operation of the electronic apparatus 110 will be described below with reference to FIG. 2.

The user terminal 120, which is a terminal that is operated and managed by a user, may receive a user input and perform a corresponding operation. For example, the user terminal 120 may provide the first page to the user, receive a user input corresponding to a request for access to the second page through the first page, and provide a request for access to the second page to the electronic apparatus 110. Also, the user terminal 120 may receive the second page from the electronic apparatus 110 and provide the second page to the user.

The user terminal 120 may include a computer device, a mobile communication terminal, a server, and the like. The user terminal 120 may include an input device such as a touchpad, a mouse, or a keyboard for receiving a user input or may be connected to an input device. Also, the user terminal 120 may include an output device such as a screen or a speaker for providing information to a user or may be connected to an output device. Furthermore, the input device and the output device of the user terminal 120 may be integrated or interrelated with each other. For example, an interface for receiving a user input may be displayed on the screen of the user terminal.

Operations related to a series of information processing methods according to various example embodiments may be implemented by a single physical device or may be implemented in a manner in which a plurality of physical devices are organically combined. For example, some of the elements included in the information processing system 100 for providing a page may be implemented by one physical device, and the other elements may be implemented by another physical device. For example, one physical device may be implemented as a portion of the electronic apparatus 110, and another physical device may be implemented as a portion of the user terminal 120 or a portion of an external apparatus. In some cases, elements included in the information processing system 100 for providing a page are distributed and arranged in different physical devices, and the distributed elements may be organically combined and implemented to perform the functions and operations of the information processing system 100 for providing a page. For example, the electronic apparatus 110 of the present specification may include at least one sub-apparatus. Some operations described as being performed by the electronic apparatus 110 may be performed by a first sub-apparatus, and other operations may be performed by a second sub-apparatus.

Figure 2:
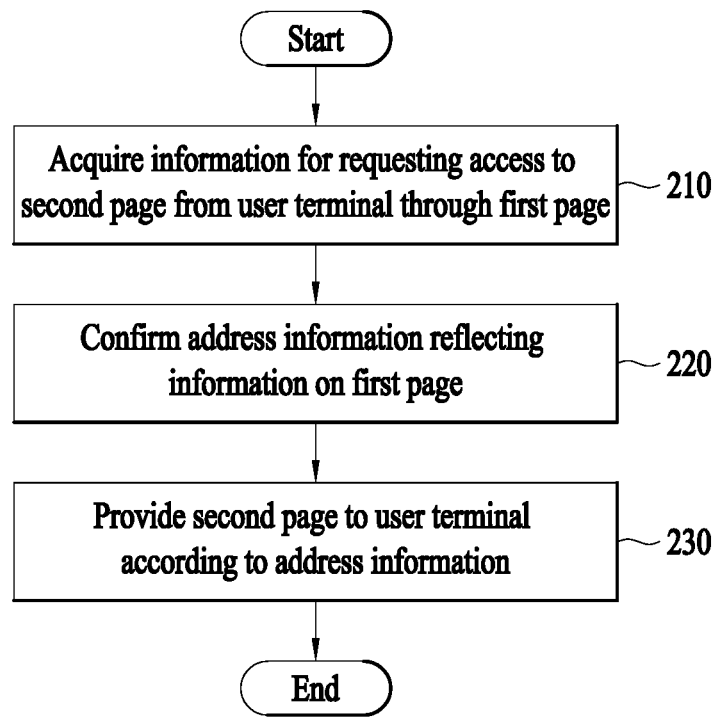
FIG. 2 is a flowchart of an information processing method of an electronic apparatus in an information processing system for providing a page according to an example embodiment.

FIG. 2 is a flowchart illustrating an information processing method of an electronic apparatus in an information processing system for providing a page according to an example embodiment.

Referring to FIG. 2, an electronic apparatus 110 according to an example embodiment acquires information for requesting access to a second page from a user terminal 120 through a first page in operation 210. As described above, the first page may include information related to the second page.

The electronic apparatus 110 may confirm address information reflecting the information on the first page in operation 220. As described above, the information on the first page may be acquired by concatenating one or more elements corresponding to characteristics of the first page, and the address information may correspond to a URL. In this case, the URL may include the information on the first page. For example, when the information on the first page includes "1221159," the address information may correspond to "http://www.XXXXXXXX.com/service/category1_1221159" or the like.

More specifically, the address information according to an example embodiment may correspond to a landing URL. In this case, the address information may include information including the address of the second page, which is a landing page (a webpage that is initially viewed by a user who accesses via a search engine, an advertisement, etc.).

The information on the first page may include a sequence of numbers with a predetermined number of digits such as "1221159", a sequence of letters with a predetermined number of letters such as "qjcowhe", or a combination of numbers and letters with a predetermined number of characters such as "2jyd72n." When the information on the first page includes a sequence of numbers with a predetermined number of digits, the sequence of numbers with a predetermined number of digits may correspond to a serial number.

According to an example embodiment, the information on the first page may include a combination of numbers and letters expressed according to a specific numbering system. For example, the information on the first page may include "12a227" representing "1221159" in hexadecimal notation. By expressing the information on the first page according to a specific numbering system, it is possible to increase the efficiency of data transmission or reception or secure compatibility with the user terminal 120 and other external apparatuses.

An example embodiment in which the information on the first page includes a sequence of numbers with a predetermined number of digits will be described below. However, this example embodiment is only for convenience of description, and various example embodiments in which the information on the first page includes a combination of numbers and letters with a predetermined number of characters, a sequence of letters with a predetermined number of letters, or special characters may be carried out and should not be construed as limiting the scope of the present disclosure.

According to an example embodiment, the information on the first page may include at least one of information related to a page type or a page form of the first page, fee information related to the first page, information related to a type of user terminal 120 capable of implementing the first page, and provider information related to the first page. According to an example, the information on the first page may correspond to "1221159," which is obtained by sequentially concatenating "1" which is a number corresponding to the fee information related to the first page, "22" which is a number corresponding to the page type or page form of the first page, "1" corresponding to the information related to a type of user terminal 120 capable of implementing the first page, and "159" corresponding to the provider information related to the first page.

More details related to the information on the first page and the address information will be described below with reference to FIGS. 3 to 6.

In relation to an operation of confirming the address information reflecting the information on the first page, the electronic apparatus 110 may confirm first identification information corresponding to a program that is used by the user terminal 120 to make an access request. Also, the electronic apparatus 110 may acquire mapping information in which the first identification information and the identification information of the user terminal 120 are mapped to each other. Based on the acquired mapping information, the electronic apparatus 110 may track activity history of the user terminal 120 through at least one program other than the program corresponding to the first identification information.

More details related to the first identification information and the mapping information will be described below with reference to FIG. 7.

The electronic apparatus 110 provides a second page to the user terminal 120 according to the address information in operation 230.

More specifically, the electronic apparatus 110 or an external apparatus may analyze a correlation relationship between the information on the first page and a user input corresponding to the second page. For example, the electronic apparatus 110 or an external apparatus may collect a plurality of pieces of data including the information on the first page and the user input corresponding to the second page and statistically analyze the collected data or input the collected data to a calculation model such as a machine learning model. Thus, the electronic apparatus 110 may analyze relationships between the information on the first page and various user inputs corresponding to the second page.

According to an example embodiment, the first page may include an advertisement region, and the user terminal 120 may request access to the second page through a user input to the advertisement region. In this case, the advertisement region may correspond to the interface for access to the second page or may be included in the interface for access to the second page. In this case, the user input corresponding to the second page may be received from the user terminal 120, and an effect on the advertisement area may be analyzed based on the user input corresponding to the second page.

As an example, a user searches for item information through a search engine, a keyword advertisement may be exposed on the first page, which is a result of the search, and an input of selecting the keyword advertisement may be received from the user terminal 120. In this case, since the selection information corresponds to a request for access to the second page, which sells an item, the electronic apparatus 110 may provide the second page to the user terminal 120 according to address information reflecting the information on the first page (e.g., including information indicating that specific item information is searched for and information indicating that the keyword advertisement, which is the result of the search, is selected). In relation to a total of 2,548 cases in which a user searches for item information through a search engine and accesses the second page through an input of selecting the keyword advertisement, it is assumed that an item purchase input is received by the second page in 162 cases and a membership registration input is received by the second page in 55 cases. At this time, through statistical analysis, the corresponding keyword advertisement may be determined as having an item purchase induction rate of 6.35% and a membership registration induction rate of 2.16%. Alternatively, as described above, it is possible to derive an analysis result by inputting such data to a calculation model.

By reflecting the information on the first page in the address information, it is possible to discern the information on the first page even when the information on the first page is not separately stored, and it is also possible to easily analyze a relationship between the information on the first page and an input to the second page.

Figure 3:
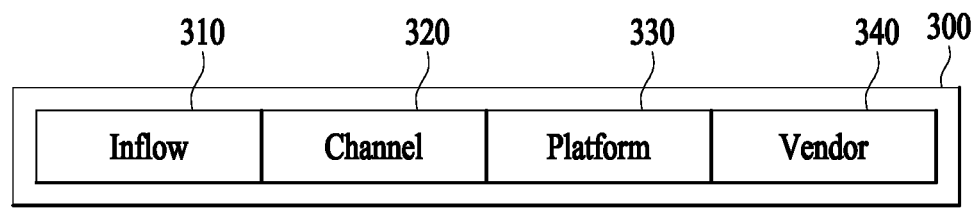
FIG. 3 is a diagram illustrating information on a first page according to an example embodiment.

FIG. 3 is a diagram illustrating information on a first page according to an example embodiment.

Referring to FIG. 3, information 300 on the first page according to an example embodiment may include at least one of fee information related to the first page, information related to a page type or a page form of the first page, information related to a type of user terminal capable of implementing the first page, and provider information related to the first page.

The fee information related to the first page may include at least one of operating fee information for the first page, fee information related to provision of an interface for accessing a second page from the first page, and fee information related to payment to a service provider of the first page in order to display an advertisement region on the first page. For convenience of description, fee information is hereinafter referred to as an inflow 310.

Information related to the page type of the first page may correspond to what type of page the first page corresponds to. Also, information related to the page form of the first page may correspond to information related to what information the page includes and how information included in the page is displayed on the page. For example, the page type of the first page may include a first type related to a main page of a search portal, a second type related to a search result of a search engine, a third type related to an email service page, and the like. Also, the form of the first page may include the type of included advertisement (a keyword advertisement, a banner advertisement, a media exposure advertisement, a viral marketing advertisement, etc.), the target of an advertisement (membership sign-up induction, item purchase induction, corporate image improvement, upcoming service promotion, etc.), and information related to how information is displayed on the page (top exposure, pop-up exposure, keyword autocomplete-type exposure, etc.). For convenience of description, the information related to the page type and the page form of the first page is hereinafter referred to as a channel 320.

Information related to the type of user terminal 120 capable of implementing the first page may be information including the type of user terminal 120 capable of displaying the first page, the type of user terminal 120 capable of displaying an interface for access to the second page, and the like. For example, when the first page can be displayed on a personal computer (PC) and a mobile terminal while the interface for access to the second page can be displayed on a PC but cannot be displayed on a mobile terminal, information about this situation may be included in the information related to the type of user terminal 120. Also, depending on the operating system of a PC or the model of a mobile terminal, information that can be displayed on some PCs may not be displayed on other PCs, or information that can be displayed on some mobile terminals may not be displayed on other mobile terminals. For convenience of description, the information related to the type of user terminal 120 capable of implementing the first page is hereinafter referred to as a platform 330.

The provider information related to the first page may include at least one of service provider information of the first page, information on a specific provider that provides an interface for access from the first page to the second page, and service provider information of the second page (since the interface for access to the second page is started on the first page, the service provider information of the second page is also the provider information related to the first page.). For convenience of description, the provider information related to the first page is hereinafter referred to as a vendor 340.

The information 300 on the first page may include a sequence of numbers with a predetermined number of digits such as "1221159."

Also, the information 300 on the first page may include a sequence of letters with a predetermined number of letters such as "qjcowhe," or a combination of numbers and letters with a predetermined number of characters such as "2jyd72n." When the information 300 on the first page includes a sequence of numbers with a predetermined number of digits, the sequence of numbers with a predetermined number of digits may correspond to a serial number.

The information 300 on the first page may include a sequence of numbers with a predetermined number of digits reflecting at least one of fee information related to the first page, information related to a page type or a page form of the first page, information related to a type of user terminal capable of implementing the first page, and provider information related to the first page. As described above, the information 300 on the first page may be displayed in various forms of a number sequence or a letter sequence, including letters or special characters in addition to a sequence of numbers. However, for the purpose of description, an example embodiment in which the information 300 on the first page includes a sequence of numbers with a predetermined number of digits will be described below.

FIG. 4 is a diagram illustrating information on a first page according to an example embodiment.

Referring to FIG. 4, the information 300 on the first page according to an example embodiment may include an inflow 310, a channel 320, a platform 330, and a vendor 340, to which numbers may be assigned according to their type as represented by a table 400. For example, 1 may be assigned to the inflow 310 when a fee is paid to a service provider ("Paid"), 2 may be assigned to the inflow 310 when no fee is paid ("NonPaid"), and 8 may be assigned to the inflow 310 when fees are not managed by an electronic apparatus 110 ("NonAttribute").

In a similar manner, numbers may be assigned to the channel 320, the platform 330, and the vendor 340 according to their type, and a serial number corresponding to a sequence of numbers generated by performing an operation of concatenating the assigned numbers as elements may be included in the information 300 on the first page. For example, 1 may be assigned to the inflow 310 because a fee is paid to the service provider, 22 may be assigned to the channel 320 because the information related to the page type and page form corresponds to "others" ("OtherRecruit), 1 may be assigned to the platform 330 because the type of user terminal 120 capable of implementing the first page is "PC," and 159 may be assigned to the vendor 340 because the provider corresponds to the company "AAA." In this case, a serial number of "1221159" may be generated as indicated by reference numeral 410.

Similarly, 8 may be assigned to the inflow 310 because fees are not managed by the electronic apparatus 110, 20 may be assigned to the channel 320 because the information related to the page type and page form corresponds to "display on screen," 2 may be assigned to the platform 330 because the type of user terminal 120 capable of implementing the first page is "mobile terminal" ("Mobile"), and 158 may be assigned to the vendor 340 because the provider corresponds to the company "BBB." In this case, a serial number of "8202158" may be generated as indicated by reference numeral 420.

Similarly, in the case of reference numerals 430 and 440, serial numbers of "2183157" and "8229156" may be generated by sequentially concatenating numbers assigned to the inflow 310, the channel 320, the platform 330, and the vendor 340.

In the examples of reference numerals 410 and 440, the numbers assigned to the inflow 310, the channel 320, the platform 330, and the vendor 340 are sequentially concatenated. However, the concatenation does not necessarily have to be performed in the order of the inflow 310, the channel 320, the platform 330, and the vendor 340. For example, in the example of reference numeral 410, the serial number may be "2211591" due to the numbers being concatenated in the order of the channel 320, the platform 330, the vendor 340, and the inflow 310. In addition, serial numbers may be generated in various ways.

As described above, address information reflecting the information 300 on the first page may correspond to a URL. For example, address information corresponding to the example of reference numeral 410 may correspond to "http://www.XXXXXXXX.com/service/cat-egory1_1221159," address information corresponding to the example of reference numeral 420 may correspond to "http://www.XXXXXXXX.com/service/cat-egory1_8202158," address information corresponding to the example of reference numeral 430 may correspond to "http://www.XXXXXXXX.com/service/cat-egory1_21583157," and address information corresponding to the example of reference numeral 440 may correspond to "http://www.XXXXXXXX.com/service/cat-egory1_8229156."

The address information and serial number reflecting the information 300 on the first page may be automatically input by the electronic apparatus 110 or may be manually input by an administrator. When the address information and serial number reflecting the information 300 on the first page are automatically input by the electronic apparatus 110, the name of a registrant may not be displayed, or the name of a representative administrator may be automatically displayed as a registrant. Meanwhile, when the address information and serial number reflecting the information 300 on the first page are manually input by an administrator, the name of the administrator that inputs the address information and serial number may be displayed as a registrant.

An example of an interface for an administrator manually inputting the serial number and address information reflecting the information 300 on the first page will be described below with reference to FIG. 6.

FIG. 5 is a diagram illustrating an operation of determining values of one or more elements corresponding to characteristics of a first page according to an example embodiment.

Referring to FIG. 5, an example 500 in which numbers are assigned according to the type of inflow 310 according to an example embodiment is shown in greater detail. Specifically, when a fee is paid to a service provider ("Paid"), 1 may be assigned to the inflow 310 as indicated by reference numeral 510. When no fee is paid ("NonPaid"), 2 may be assigned to the inflow 310 as indicated by reference numeral 520. When a fee is supported by the vendor 340 ("VendorFunding"), 3 may be assigned to the inflow 310 as indicated by reference numeral 530. When a fee is shared ("CMG"), 7 may be assigned to the inflow 310 as indicated by reference numeral 540. When fees are not managed by the electronic apparatus 110 ("NonAttribute"), 8 may be assigned to the inflow 310 as indicated by reference numeral 550. Also, in other cases ("Others"), 9 may be assigned to the inflow 310 as indicated by reference numeral 56.

Different numbers may be assigned to the channel 320, the platform 330, and the vendor 340 according to their type in a similar way to the above.

FIG. 6 is a diagram illustrating an interface for inputting values of one or more elements corresponding to characteristics of a first page according to an example embodiment.

Referring to FIG. 6, an interface 600 for inputting values of one or more elements corresponding to characteristics of a first page according to an example embodiment is shown. As described above, serial number and address information reflecting the information 300 on the first page may be manually input by an administrator. In this case, the administrator may assign the values of the elements corresponding to the characteristics of the first page according to the interface indicated by reference numeral 600. The values of the elements may be assigned by a user directly entering the values (e.g., through an input device such as a keyboard) or may be assigned by displaying a list of candidates of values included in choices for each element according to an input corresponding to a request by a user to display the choices and then selecting one of the candidates included in the choices according to the user's subsequent input.

After the value of each element is assigned, a serial number may be generated when there is a final decision input of a user. According to an example embodiment, an interface for receiving the user's final input may include the text "register."

In some example embodiments, when the values of all the elements corresponding to the characteristics of the first page are assigned, a serial number may be generated without the user's final decision input.

Figure 7:
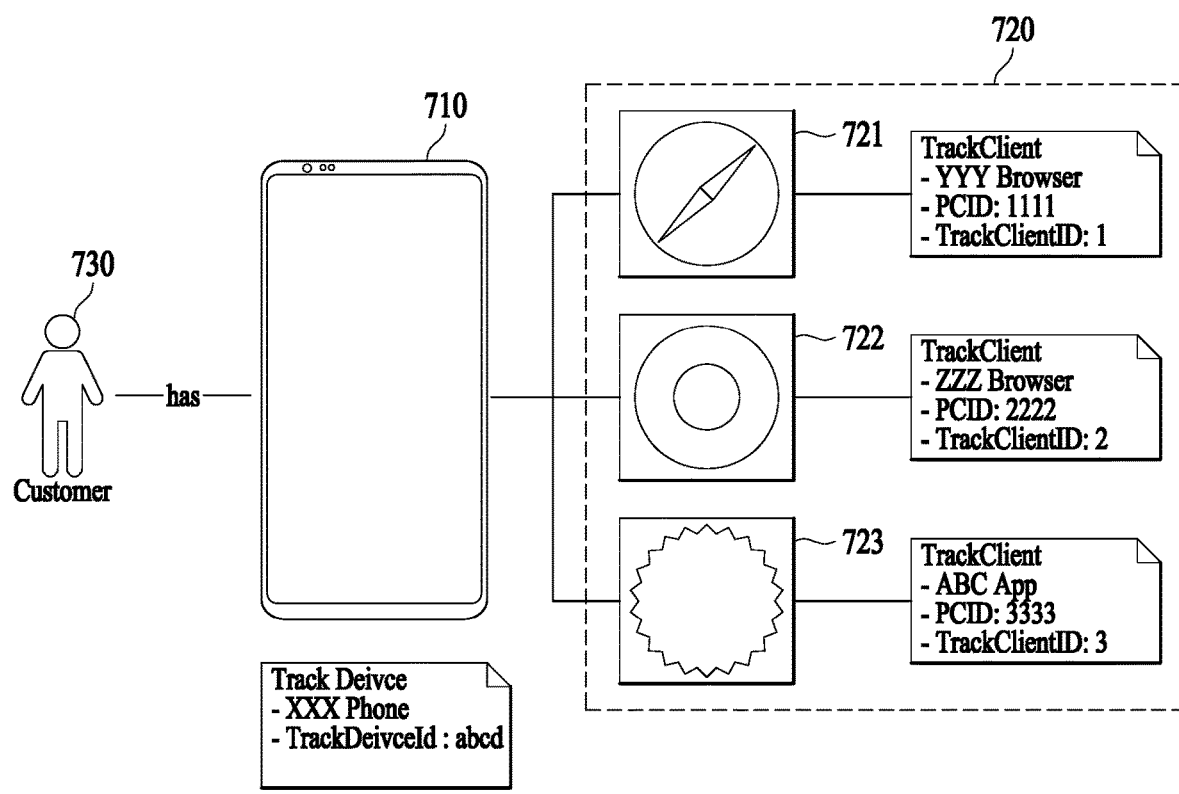
FIG. 7 is a diagram illustrating mapping information according to an example embodiment.

FIG. 7 is a diagram illustrating mapping information according to an example embodiment.

Referring to FIG. 7, an electronic apparatus 110 according to an example embodiment may confirm first identification information 720 corresponding to a program used by a user terminal 120 to request access. The program corresponding to the first identification information 720 may correspond to a program that displays an interface for receiving a user input on a user terminal screen. For example, the program used by the user terminal 120 to make an access request may include at least one of a web browser installed on the user terminal 120 and an application installed on the user terminal 120. In this regard, the first identification information 720 may be determined to have different values when different programs are used and the same value when the same program is used.

The first identification information 720 may correspond to a sequence of numbers with a predetermined number of digits. In some example embodiments, the first identification information 720 may further include a letter, a special character, or the like. However, for convenience of description, an example embodiment in which the first identification information 720 includes a sequence of numbers with a predetermined number of digits will be described below.

When a browser "YYY" is used by the user terminal 120 to make an access request, the identification information 720 according to an example embodiment may correspond to 1 as indicated by reference numeral 721. When a browser "ZZZ" is used by the user terminal 120 to make an access request, the identification information 720 may correspond to 2 as indicated by reference numeral 722. When an application "ABC" is used by the user terminal 120 to make an access request, the identification information 720 may correspond to 3 as indicated by reference numeral 723.

Also, the electronic apparatus 110 may acquire mapping information in which the first identification information 720 and the identification information of the user terminal 120 are mapped to each other. Also, the electronic apparatus 110 may acquire mapping information by directly mapping the first identification information 720 and the identification information of the user terminal 120 and also may acquire mapping information from the user terminal 120. When the mapping information is acquired from the user terminal 120, mapping may be performed by the user terminal 120.

According to an example embodiment, when the user terminal 120 is a mobile phone "XXX," the identification information of the user terminal 120 may correspond to "abcd" 710, and the corresponding identification information and the first identification information 720 may be mapped to each other.

The electronic apparatus 110 may store the mapping information, and the stored mapping information may be kept for a predetermined period of time. By keeping the stored mapping information in the electronic apparatus 110 for at least a predetermined period of time, the electronic apparatus 110 may track the activity history of the user terminal 120 through another program. For example, when a user input using a program corresponding to the first identification information 720 "3" is received from the user terminal 120 corresponding to identification information "abcd" while mapping information in which the first identification information 720 "3" is mapped to the identification information "abcd" of the user terminal 120 is stored in the electronic apparatus 110, the electronic apparatus 110 may confirm that the corresponding user input is applied by the user terminal 120. That is, even in the case of a plurality of inputs using different programs, when the mapped identification information of the user terminal 120 is the same, the plurality of inputs can be correlated and understood.

For example, a request to add a first item to a shopping cart using a program corresponding to the first identification information 720 "3" may be made by the user terminal 120 corresponding to the identification information "abcd," and thereafter, a request to add a second item to the shopping cart using a program corresponding to the first identification information 720 "2" may be made by the user terminal 120 corresponding to the identification information "abcd." In this case, the electronic apparatus 110 may add the first item and the second item to one shopping cart list.

According to an example embodiment, the mapping information may be information in which identification information corresponding to a user 730 is additionally mapped. For example, when a login input using a user ID is applied to at least one of the first page and the second page by the user terminal 120, corresponding login ID information may be mapped to the first identification information 720 and the identification information of the user terminal 120.

When the identification information corresponding to the user is additionally mapped to the mapping information, the user's activity history may be tracked through another user terminal 120 in addition to another program. For example, even when a user input is received from a user terminal 120 corresponding to identification information "efgh" while mapping information in which user identification information "QQQ," the identification information "abcd" of the user terminal 120, and the first identification information 720 "3" are mapped is stored in the electronic apparatus 110, the corresponding user input may correspond to the user identification information QQQ (e.g., an input is made when a login is made by a corresponding user ID). In this case, the electronic apparatus 110 may confirm that the corresponding user input is made by the same user. That is, even in the case of a plurality of inputs using different user terminals 120, when the mapped identification information of the user terminals 120 is the same, the plurality of inputs can be correlated and understood.

Figure 8:
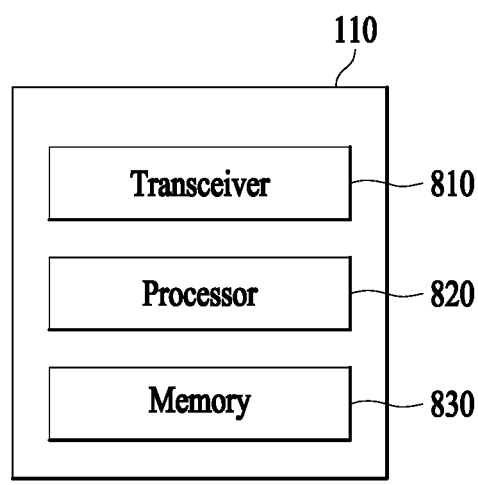
FIG. 8 is an exemplary diagram of a configuration of an electronic apparatus for processing information for providing a page according to an example embodiment.

FIG. 8 is an exemplary diagram of a configuration of an electronic apparatus for processing information for providing a page according to an example embodiment.

Referring to FIG. 8, the electronic apparatus 110 includes a transceiver 810, a processor 820, and a memory 830. The electronic apparatus 110 may be connected to the user terminal 120, other external apparatuses, etc. through the transceiver 810 to exchange data.

The processor 820 may include at least one of the apparatuses that have been described with reference to FIGS. 1 to 7 or may perform at least one of the methods that have been described with reference to FIGS. 1 to 7. The memory 830 may store information for performing at least one of the methods (including at least some of the information 300 on the first page, the address information, the first identification information 720, and the mapping information) that have been described with reference to FIGS. 1 to 7. The memory 830 may be a volatile memory or a nonvolatile memory.

The processor 820 may execute a program and may control the electronic apparatus 110 for providing information. Code of the program executed by the processor 820 may be stored in the memory 830.

Also, the electronic apparatus 110 according to an example embodiment may further include an interface for providing information to a user.

Meanwhile, in the present specification and the accompanying drawings, exemplary example embodiments of the present disclosure have been disclosed, and although specific terms are used, these terms are only used in a general sense to easily describe the technical content of the present disclosure and to aid understanding of the present disclosure and do not limit the scope of the present disclosure. It is obvious to those skilled in the art that in addition to the example embodiments disclosed herein, various modifications may be made without departing from the technical spirit of the present disclosure.

According to the above-described example embodiments, an electronic apparatus or a terminal may include a processor, a memory configured to store and execute program data, a permanent storage such as a disk drive, a communication port configured to communicate with an external apparatus, a user interface device such as a touch panel, a key, and a button, and the like. Methods implemented using software modules or algorithms may be stored on a computer-readable recording medium as computer-readable code or program instructions executable on the processor. Here, the computer-readable recording medium may include a magnetic storage medium (e.g., ROM, RAM, floppy disk, hard disk, etc.), an optical reading medium (e.g., CD-ROM, digital versatile disc (DVD), etc.), and the like. The computer-readable recording medium may be distributed over network-coupled computer systems so that the computer-readable code is stored and executed in a distributed fashion. The medium is readable by a computer, stored in a memory, and executed on a processor.

The example embodiments may be described in terms of functional block components and various processing operations. The functional blocks may be implemented by various numbers of hardware and/or software components configured to perform specific functions. For example, the example embodiments may employ integrated circuit elements, such as a memory, a processing circuit, a logic circuit, and a look-up table, for executing various functions under the control of one or more microprocessors or other control apparatuses. Similar to the elements being executable with software programming or software elements, the example embodiments may be implemented with a programming or scripting language, such as C, C++, Java, and an assembler, including various algorithms implemented with a combination of data structures, processes, routines or other programming elements. Functional aspects may be implemented with an algorithm executed by one or more processors. Furthermore, the example embodiments may employ any number of related art techniques for electronics configuration, signal processing, data processing, and the like. The terms "mechanism," "element," "means," and "configuration" may be widely used and are not limited to mechanical and physical configurations. The terms may include a meaning of a series of routines of software in association with a processor.

The above-described example embodiments are only examples, and other example embodiments may be implemented within the scope of the claims, which will be described below.

What is claimed is:

1. A method of processing information in an electronic apparatus, the method comprising:
   causing display of, on a display of a user terminal, a first page including interfaces for accessing to other pages, wherein the first page is associated with a plurality of characteristics;
   determining program identification information associated with a program, used by the user terminal, configured to receive a user input comprising instructions to navigate a second page, wherein the instructions comprise selection of an interface for accessing to the second page;
   receiving, based on user interaction with the first page and by the user terminal, the user input comprising the instructions to navigate to the second page;
   receiving mapping information relating the program identification information with user terminal identification information, wherein the user terminal identification information describes the user terminal that displayed the first page;
   storing the mapping information, wherein the stored mapping information is kept for a predetermined period of time;
   generating a plurality of digits, wherein each digit, of the plurality of digits, represents a given characteristic of the plurality of the characteristics of the first page;
   generating a serial number by concatenating each digit, of the plurality of digits, in an order;
   generating, based on the serial number, address information of the second page; and
   according to the address information, causing display of, on the user terminal, the second page,
   wherein the plurality of characteristics include:
   fee information related to the first page, and
   information on one or more types of devices which are capable of implementing the first page.

2. The method of claim 1, wherein at least one of the interfaces is related to a uniform resource locator (URL).

3. The method of claim 1, wherein the plurality of characteristics further include at least one of:
   first page identification information related to, of the first page, a page type or a page form, or
   information regarding an origin of the first page.

4. The method of claim 1, wherein displaying the first page comprises displaying, in an advertisement area, visual information associated with the address information of the second page, and
   wherein receiving the user input comprises receiving a user interaction with the advertisement area.

5. The method of claim 4, further comprising:
   receiving, based on the display of the second page, a second user input comprising an interaction with content associated with the second page; and
   analyzing, based on the second user input, the interaction with the content associated with the second page.

6. The method of claim 1, wherein the program includes:
   a web browser installed on the user terminal, or
   an application installed on the user terminal, or
   a combination of the web browser and the application.

7. The method of claim 1, further comprising:
   tracking, via at least a second program and based on the mapping information, an activity history of the user terminal, wherein the at least second program is different than the program configured to receive the user input.

8. The method of claim 1, wherein the mapping information comprises user identification information.

9. A non-transitory computer-readable recording medium storing instructions, when executed by one or more processors, cause the one or more processors to perform actions comprising:
   causing display of, on a display of a user terminal, a first page including interfaces for accessing to other pages, wherein the first page is associated with a plurality of characteristics;
   determining program identification information associated with a program, used by the user terminal, configured to receive a user input comprising instructions to navigate a second page, wherein the instructions comprise selection of an interface for accessing to the second page;
   receiving, based on user interaction with the first page and by the user terminal, the user input comprising instructions to navigate a second page;
   receiving mapping information relating the program identification information with user terminal identification information, wherein the user terminal identification information describes the user terminal that displayed the first page;
   storing the mapping information, wherein the stored mapping information is kept for a predetermined period of time;
   generating a plurality of digits, wherein each digit, of the plurality of digits, represents a given characteristic of the plurality of the characteristics of the first page;
   generating a serial number by concatenating each digit, of the plurality of digits, in an order;
   generating, based on the serial number, address information of the second page; and
   according to the address information, causing display of, on the user terminal, the second page,
   wherein the plurality of characteristics include:
   fee information related to the first page, and
   information on one or more types of devices which are capable of implementing the first page.

10. An electronic apparatus for processing information, the electronic apparatus comprising:
  a transceiver;
  a memory configured to store instructions; and
  a processor, connected to the transceiver and to the memory, and, based on execution of the instructions, configured to control the electronic apparatus to:
  cause display of, on a display of a user terminal, a first page including interfaces for accessing to other pages, wherein the first page is associated with a plurality of characteristics;
  determine program identification information associated with a program, used by the user terminal, configured to receive a user input comprising instructions to navigate a second page, wherein the instructions comprise selection of an interface for accessing accessing to the second page;
  receive, based on user interaction with the first page and by the user terminal, the user input comprising the instructions to navigate to the second page;
  receiving mapping information relating the program identification information with user terminal identification information, wherein the user terminal identification information describes the user terminal that displayed the first page;
  storing the mapping information, wherein the stored mapping information is kept for a predetermined period of time;
  generate, a plurality of digits, wherein each digit, of the plurality of digits, represents a given characteristic of the plurality of the characteristics of the first page;
  generate a serial number by concatenating each digit, of the plurality of digits, in an order;
  generate, based on the serial number, address information of the second page; and
  according to the address information, cause display of, on the user terminal, the second page,
  wherein the plurality of characteristics include:
  fee information related to the first page, and
  information on one or more types of devices which are capable of implementing the first page.

* * * * *